United States Patent [19]
Takabayashi et al.

[11] Patent Number: 5,706,413
[45] Date of Patent: Jan. 6, 1998

[54] PRINTER

[75] Inventors: Nobuhisa Takabayashi; Takashi Kato, both of Nagano, Japan

[73] Assignee: Seiko Epson Corporation, Tokyo, Japan

[21] Appl. No.: 755,340

[22] Filed: Nov. 22, 1996

[30] Foreign Application Priority Data

Nov. 29, 1995 [JP] Japan .................. 7-310309

[51] Int. Cl.$^6$ ............................. G06H 15/00
[52] U.S. Cl. ............................. 395/110; 395/115
[58] Field of Search ................ 395/101, 110, 395/115, 116, 114, 805, 112, 167–172, 882, 885, 892; 400/61–62, 67, 70, 69, 76; 358/470, 404, 444

[56] References Cited

U.S. PATENT DOCUMENTS 5,239,621  8/1993  Brown, III et al. .......... 395/115

FOREIGN PATENT DOCUMENTS

| 0 356 076 | 2/1990 | European Pat. Off. | G06K 15/02 |
| 0 397 111 | 11/1990 | European Pat. Off. | G06F 3/14 |
| 0571169A1 | 11/1993 | European Pat. Off. | 395/115 |

OTHER PUBLICATIONS

Patent Abstracts of Japan vol. 006, No. 096 (P–120), Jun. 4, 1982, & JP 57 029145 A (Fujitsu Ltd), Feb. 17, 1982 *Abstract.

*Primary Examiner*—Arthur G. Evans
*Attorney, Agent, or Firm*—Sughrue, Mion, Zinn, Macpeak & Seas, PLLC

[57] ABSTRACT

Code conversion tables for some major language spheres are stored in a ROM 13 in a printer. Pattern information of all kinds of characters, discriminately represented by their internal codes, are stored in a character generator 15. For code conversion tables for other language spheres than major language spheres, the definition information of each code conversion table is registered in an EEPROM 17 in the printer, from a host device. The definition information of a code conversion table may be prepared by defining the internal codes corresponding to all of the external codes. The definition information may also be prepared in such a way that a code conversion table is selected from among the code conversion tables stored in the ROM 13 and used as a base code conversion table, and only information of the code conversion table which is different from that of the base code conversion table, is defined. Before the printing operation is performed, a CPU 19 prepares a code conversion table in a RAM 7 on the basis of related definition information in the EEPROM 17. During the printing operation, the CPU 19 refers to the code conversion table in the RAM 7.

8 Claims, 11 Drawing Sheets

FIG. 4

```
ADDITIONAL INFORMATION
   NAME OF TABLE
   BASIC TYPE
   SIZE OF EACH ELEMENT, etc.
```
| |
|---|
| INTERNAL CODE CORRESPONDING TO EXTERNAL CODE n |
| INTERNAL CODE CORRESPONDING TO EXTERNAL CODE n + 1 |
| ... |
| INTERNAL CODE CORRESPONDING TO EXTERNAL CODE m - 1 |
| INTERNAL CODE CORRESPONDING TO EXTERNAL CODE m |

37

(n IS EITHER 0 OR 128, m is 255, FOR INSTANCE)

```
ADDITIONAL INFORMATION
   NAME OF TABLE
   COMPRESSION TYPE
   IDENTIFICATION OF CONVERION TABLE AS
   BASE NUMBER OF DEFINED CHARACTER (N)
   SIZE OF EACH ELEMENT, etc.
```

| | |
|---|---|
| EXTERNAL CODE a1 | INTERNAL CODE CORRESPONDING TO a1 |
| EXTERNAL CODE a2 | INTERNAL CODE CORRESPONDING TO a2 |
| ... | ... |
| EXTERNAL CODE aN | INTERNAL CODE CORRESPONDING TO aN |

39

| INTERNAL CODE |
|---|
| CHARACTER PATTERN INFORMATION |

51

| EXTERNAL CODE | INTERNAL CODE |
|---|---|
| 0 | 0000 |
| 1 | 0025 |
|  | ... |
| 200 | 9200 |
|  | ... |
| 254 | 0644 |
| 255 | 0532 |

53

PRINTER

BACKGROUND OF THE INVENTION

The present invention relates to a printer in use with a computer system. More particularly, the invention relates to the improvement of the technique for controlling the designating codes of any symbol representative of letters, numbers, marks, and the like (referred to as characters) within the printer.

Generally, the printer receives external character codes from a host computer, and converts the external codes to corresponding internal character codes while referring to a code conversion table stored in the ROM of the printer. The internal character codes is uniquely used in the printer and called also unique codes. In the specification, the external character codes will be referred to as external codes, the host computer will be referred to frequently as a host device, and the internal character codes will be referred to as internal codes. Then, the printer uses a character generator (CG), which contains a character pattern table (containing called character font information or character pattern information), to obtain the character pattern information corresponding to the internal codes.

In the world, there are many spheres of languages having different kinds of characters, different numbers of characters, different orders of characters and the like. Some major language spheres use alphabetical letters, and some Arabic or Chinese (Kanji) characters. For this reason, the code conversion tables must be prepared corresponding to those language spheres.

In the conventional printer, the code conversion tables corresponding to the language spheres are formed and stored in the ROM in advance. When the printer is used in a language sphere, the code conversion table of the language sphere is selectively read out of the ROM, and external codes received are converted into corresponding internal codes according to the contents of the readout table.

Thus, a number of code conversion tables must be stored, and the ROM of the conventional printer must have a large memory capacity. About fifty eight (58) kinds of code conversion tables are stored in the ROM of the currently used printer. The number of code conversion tables, usually used by a user, will be two or three at most. In other words, the remaining code conversion tables are left not used. If the user desires to use another code conversion table that is not contained in the ROM of the printer, the printer cannot satisfy such a user's desire.

SUMMARY OF THE INVENTION

Accordingly, an object of the present invention is to provide a printer in which a code conversion table is externally registered in a storage contained in the printer, and there is no need of storing a number of code conversion tables in the storage.

The printer of the present invention includes a ROM, a reprogrammable nonvolatile memory (e.g., an EEPROM or a RAM backed up), and a RAM. The ROM stores one or some code conversion tables prepared for major language spheres exclusive of the code conversion tables for other many language spheres. If a code conversion table for the sphere of language, not contained in the ROM, must be used, the table definition information defining the code conversion table is input to the printer from exterior. Then, the table definition information is registered in the reprogrammable nonvolatile memory, and an additional code conversion table is formed on the RAM on the basis of the definition information. In a print mode of the printer, the printer converts the external codes into corresponding internal codes, while referring to the additional code conversion table. The reprogrammable nonvolatile memory may be contained in the printer or an external memory, such as an IC card, an I/F card or the like, which is loaded into the printer if it is required.

The table definition information of a code conversion table may be prepared by defining all of the contents in the code conversion table. The table definition information may also be prepared in such a way that only the information of the code conversion table which is different from that of a base code conversion table that is selected from among the code conversion tables stored in the ROM. In case where an additional code conversion table is thus defined on the basis of the difference information, the printer forms the additional code conversion table on the RAM on the basis of the base code conversion table of the ROM and the difference information in the nonvolatile memory.

All of tables corresponding to a plural number of major language spheres may be stored in the completed form in the ROM. In an alternative, only one code conversion table is stored in the completed form, while the remaining ones are stored in the form of the difference information. Here, the "difference information" is the information of a code conversion table to be defined, which is different from the information of the base code conversion table. In this case, the code conversion tables defined by only the difference information are developed on the RAM as in the case of the additional code conversion table.

The code conversion table formed on the RAM may be stored in the reprogrammable nonvolatile memory. Where it is stored in the nonvolatile memory, when the power switch is turned off and then turned on again, the table may be used by merely copying the code conversion table from the nonvolatile memory to the RAM. Accordingly, there is no need of forming the code conversion table every time the table is used.

In case where the backed up RAM is used, the access speed is high. Accordingly, the table may be formed on the nonvolatile memory and referred to.

The character pattern information may also be registered from exterior, in addition to the code conversion table.

BRIEF DESCRIPTION OF THE DRAWINGS

FIG. 4 is an explanatory diagram showing a basic type of definition information of a code conversion table, which is to be registered in an EEPROM in the embodiment;

FIG. 5 is an explanatory diagram showing a compression type of definition information of a code conversion table, which is to be registered in an EEPROM in the embodiment;

DESCRIPTION OF THE PREFERRED EMBODIMENTS

The preferred embodiment of the present invention will be described in detail with reference to the accompanying drawings.

Figures 1, 2:
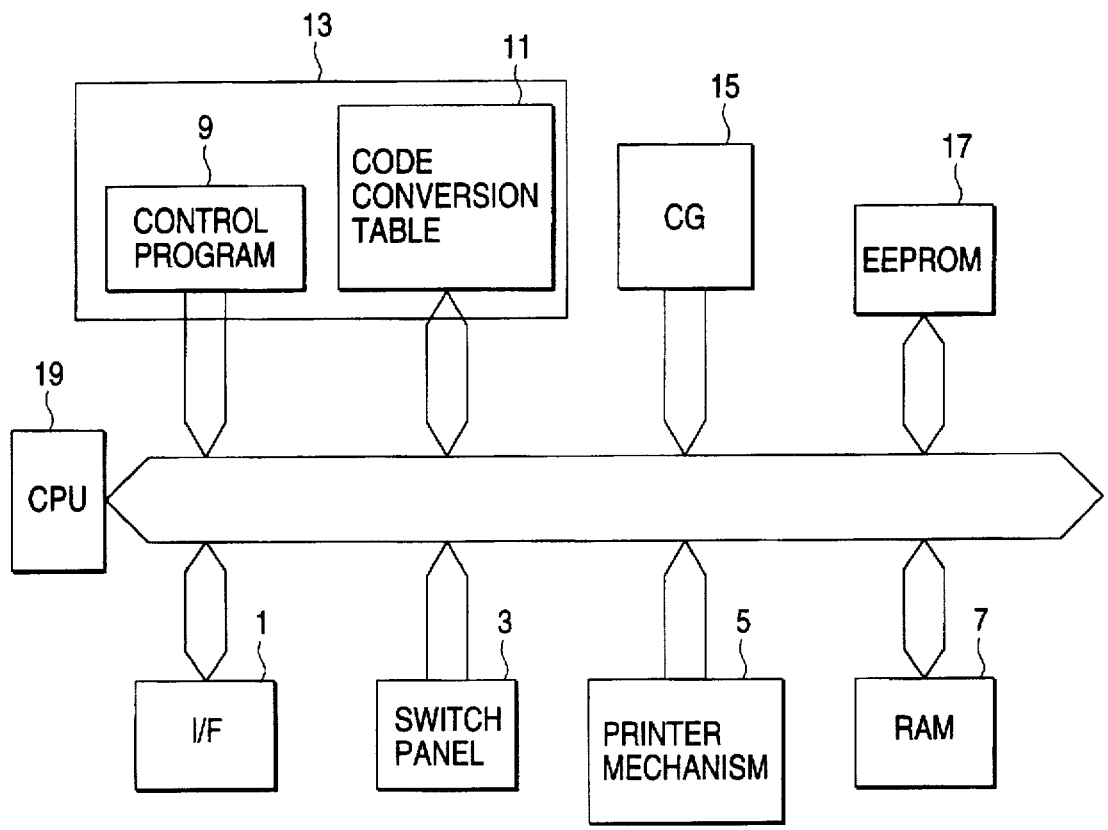
FIG. 1 is a block diagram showing a control system of a printer according to an embodiment of the present invention.
FIG. 2 shows a structure of a code conversion table used in the embodiment.

FIG. 1 is a block diagram showing an overall arrangement of a control system of a printer according to an embodiment of the present invention.

As shown, a host interface (I/F) 1, a switch panel 3, a printer mechanism 5, a RAM 7, a ROM 13, a CG (character generator) 15, an EEPROM 17, and the like are connected to a bus of a CPU 19. The I/F 1 is an interface of two-way communication used for transmitting various kinds of information necessary for the printing between the printer of the invention and a host device (not shown). The switch panel 3 is used for selectively setting operation modes of the printer and for manually setting various environments, for instance, for registering a code conversion table (described later) in the printer, from the outside of the printer. The printer mechanism 5 is a mechanism for performing an actual printing operation, which includes a printer engine, a paper feeding mechanism, and the like.

The RAM 7 provides a main memory, a work area, various data buffers, and the like, which are used by the CPU 19, for instance a memory area for developing the code conversion tables is also contained in the RAM 7. The ROM 13 stores a control program 9 for the CPU 19, and a general code conversion table 11 (e.g., a code conversion table for the sphere of the widely used language using characters, for example, alphabetical characters).

The CG 15 stores a character pattern table 31. The character pattern table 31 contains character pattern information 35 of the character fonts used in various language spheres, and a character pattern pointer 33 containing the first address of the memory locations of the various pattern information corresponding to the internal codes are stored. The EEPROM 17 is provided for storing the definition information of the code conversion tables, registered from exterior. The CPU 19 executes various data processing for the print under control of a control program 9, and further functions to externally register the code conversion table and use the registered one.

The general EEPROM 17 as the reprogrammable nonvolatile memory may be substituted by a flash ROM or such a memory as a backed up RAM, viz., any of various reprogrammable nonvolatile memory. The reprogrammable nonvolatile memory may be assembled in advance into the printer. If required, it may be an IC card, an I/F card, or another external memory, which may be set to the printer.

FIG. 2 shows an example of a code conversion table 11.

The code conversion table 11 is a table for converting external codes (e.g., 1 byte), which are received from the host device, into unique, internal codes (e.g., 2 bytes) in the printer. The correspondence between the external codes and the characters varies with the sphere of language used. Accordingly, it is necessary to prepare the code conversion tables 11 in accordance with the required language spheres. Some code conversion tables 11 (for example, the spheres of English, German, France, Spain, etc.), frequently used, are stored in the ROM 9 of the printer. The code conversion tables 11 for other language spheres are registered in the EEPROM 17 from exterior (e.g., the host device). Specifically, the definition information of those tables, viz., the definition of the table contents, are registered into the EEPROM 17 from exterior. The numbers are assigned to the code conversion tables 11, respectively, to identify the code conversion tables 11.

The code conversion tables are developed, in the completed forms, into the ROM 13. Therefore, the code conversion tables registered in the ROM 13 can directly be referred to. However, the externally registered code conversion tables cannot be directly referred to. To refer to those tables, those are developed in the completed forms into the EEPROM 17 in accordance with the definition information of the EEPROM 17. There are many ways to specify a memory in which the code conversion table is to be developed and refer to the table, as will be described later.

Figure 3:
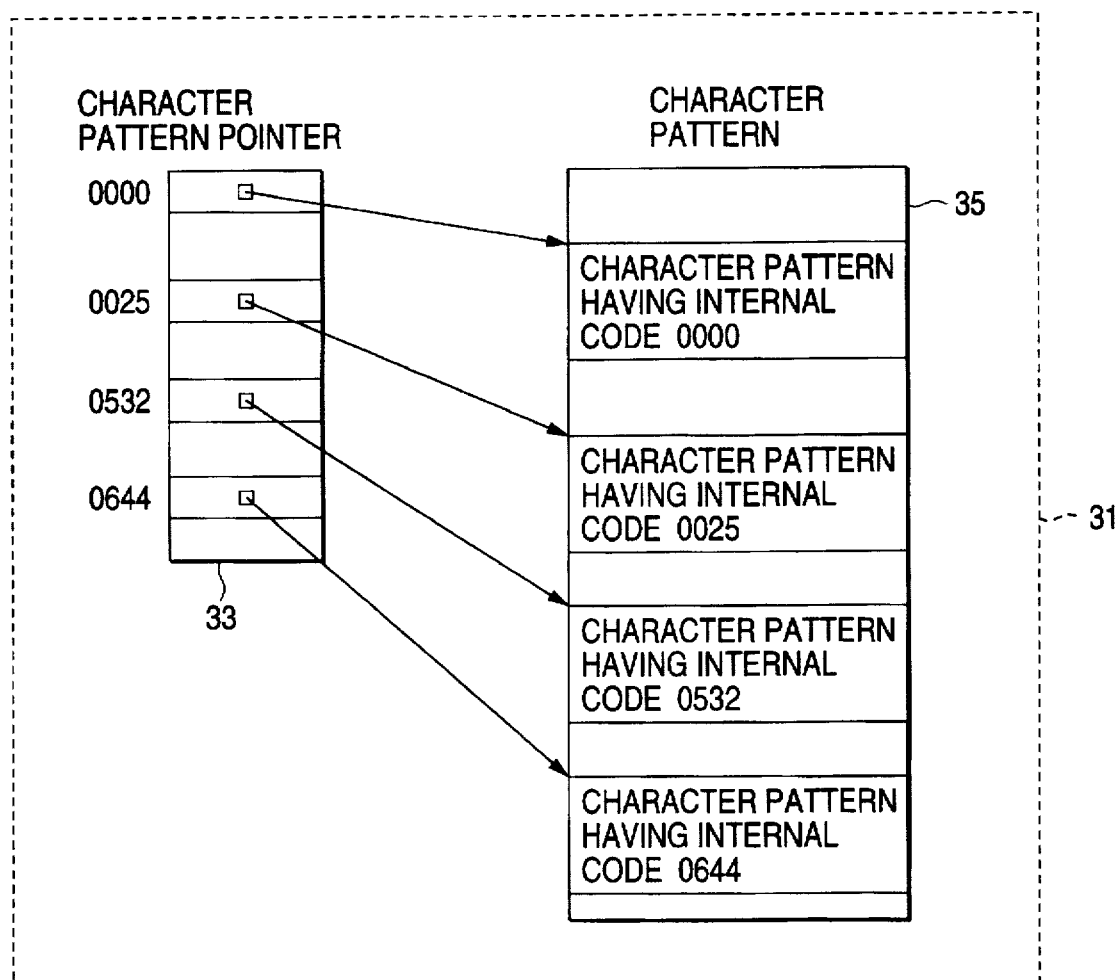
FIG. 3 is an explanatory diagram for explaining how to make an access to character patterns by the internal codes.

How to make an access to the character pattern information by the internal codes is illustrated in FIG. 3.

The CPU 19 acquires the internal codes corresponding to the external codes while referring to the code conversion table shown in FIG. 2. Then, the CPU 19 refers to the character pattern pointer 33 contained in the character pattern table 31, and acquires character pattern information 35 of the internal codes from the logic address that the pointer points. A dot pattern of a character to be printed is formed on the basis of the character pattern information 35.

FIGS. 4 and 5 show the definition information of the code conversion tables. The code conversion table to be registered from exterior is received in the form of the illustrated definition information, from an external host device, and down-loaded into the printer and written into the EEPROM 17 of the printer.

In the definition information 37 shown in FIG. 4, the internal codes are defined which correspond to all of the external codes. This type of definition information is referred to as a "basic type" of definition information. In the basic type definition information 37, additional information of the table, and the internal codes corresponding to all of the external codes n, n+1, . . . , m−1, m are defined. The additional information contains table name (the name of a corresponding language sphere, etc.), the type of definition information, and the size of each constituent element (character pattern).

To form the definition information 39 shown in FIG. 5, a specific code conversion table is selected from among those tables stored in the ROM 13, and used as a base code conversion table, and only the information of a code conversion table to be defined which is different from that of the base code conversion table are defined. This type of table definition information will be referred to as a "compression type" of definition information. In the compression type definition information 39, the additional information of the table, and the internal codes corresponding to the external codes a1 to aN, which are different from those in the base code conversion table, are defined. The additional information contains the table name, the type of definition information, i.e., compression type, the identification of the base code conversion table, the size of each constituent element (character pattern), the number (N) of defined characters, and the like. (The code conversion table most similar to the compression type code conversion table is preferably selected for the base code conversion table.) The size of the compression type definition information is smaller than that of the basic type definition information. In this respect, the amount of information is saved. A remarkable compression effect is secured particularly when the difference information of a code conversion table to be defined from that of the base code conversion table is small. Actually, there are many spheres of languages where the difference information are only several characters.

Figure 6:
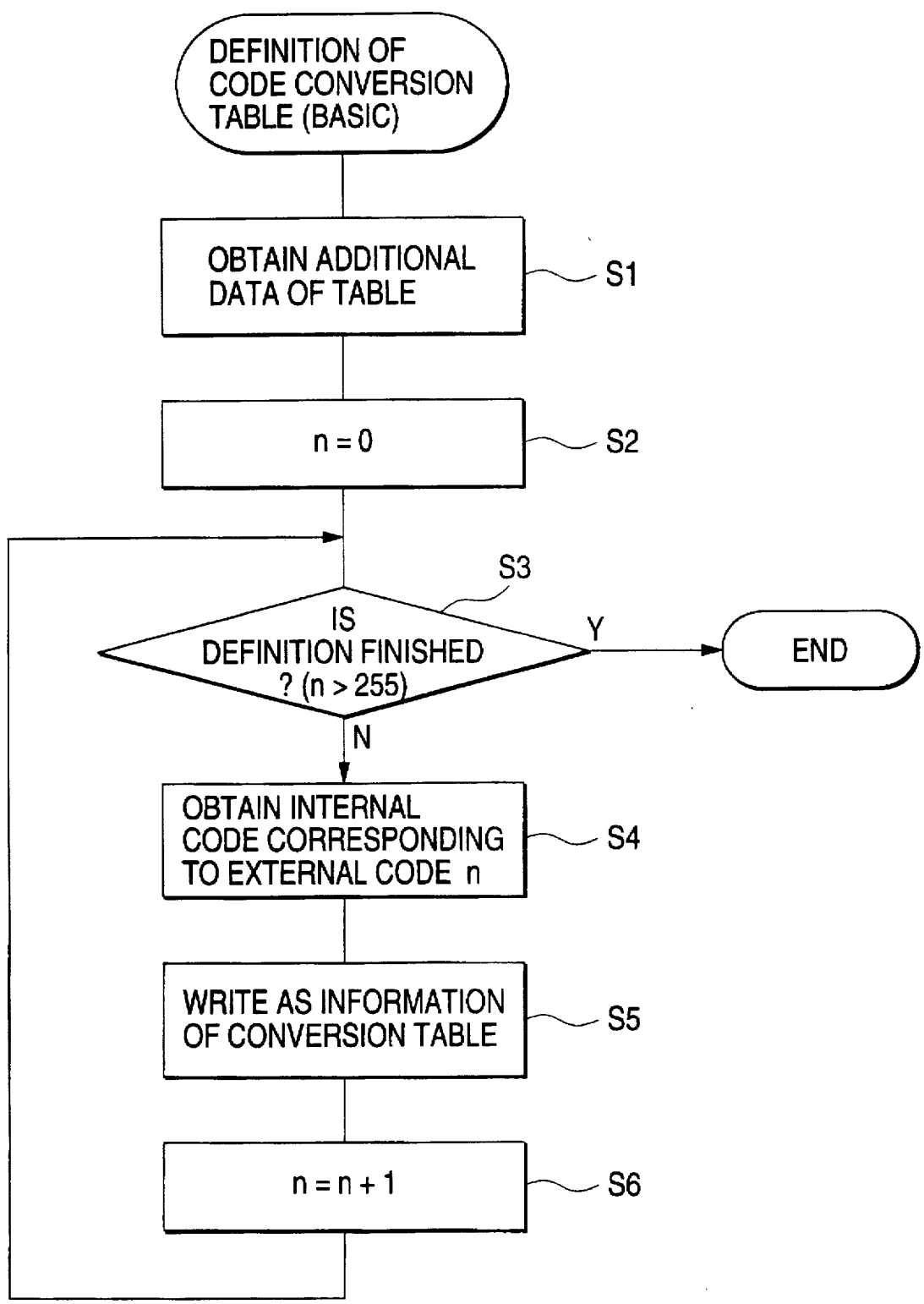
FIG. 6 is a flow chart showing a flow of a process to externally register the basic type code conversion table definition information.
Figure 7:
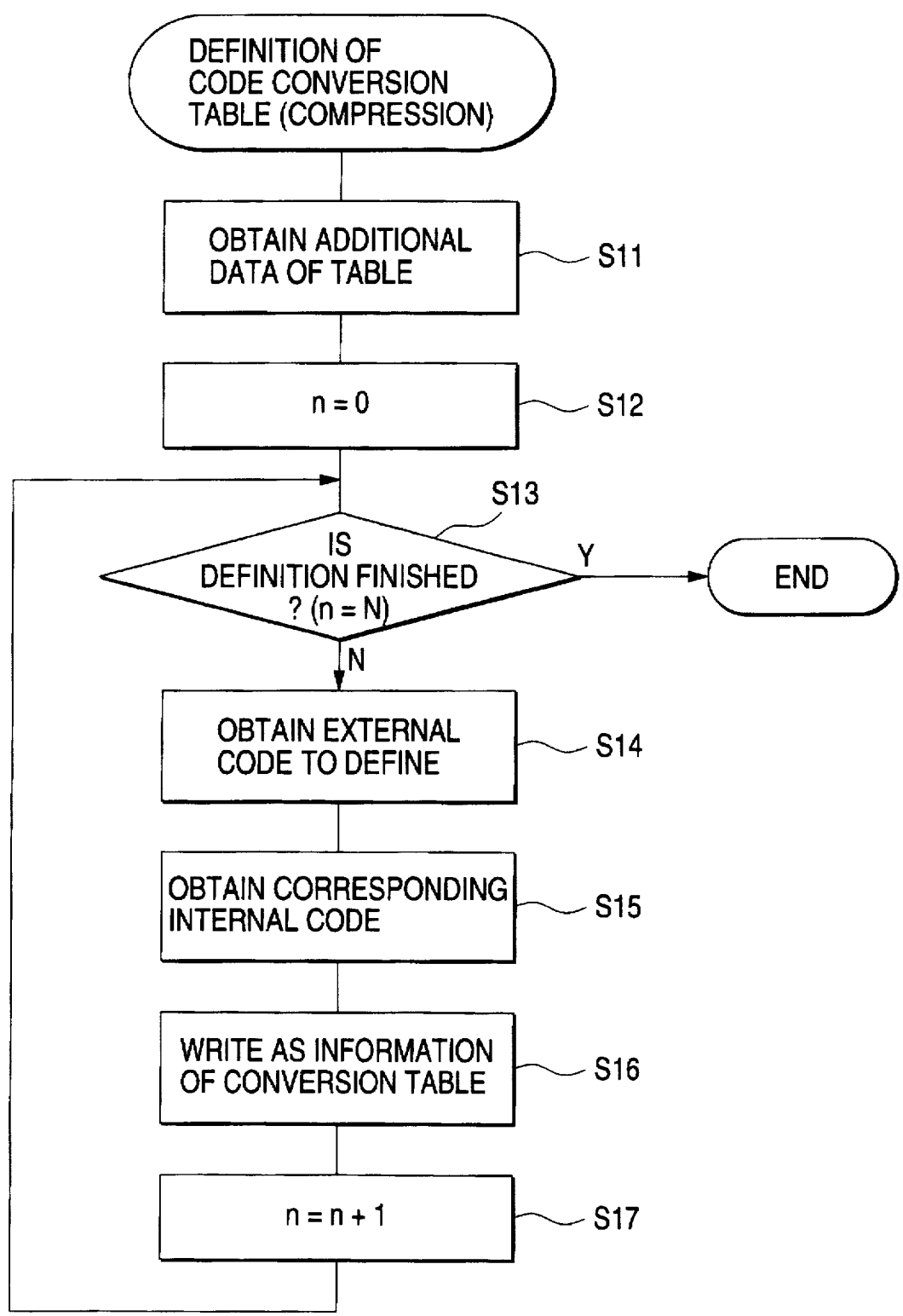
FIG. 7 is a flow chart showing a flow of a process to externally register the compression type code conversion table definition information.

FIG. 6 is a flow chart showing a flow of a process, executed by the CPU 19, to register the basic type of definition information 37 into the EEPROM 17. FIG. 7 shows a flow chart showing a flow of a process, executed by the CPU 19, to register the compression type of definition information shown in FIG. 5 into the EEPROM 17.

The process to register the basic type of definition information into the EEPROM will be described with reference to FIG. 6. The CPU 19 acquires additional information 41 of the table (of FIG. 4) from the host device, and writes it into the EEPROM 17 (step S1). The CPU 19 sets the value n of an external code to 0 (step S2), acquires the internal code corresponding to the external code n=0 from the host device, and writes the internal code as information of the code conversion table into the EEPROM 17 (step S5). The CPU 19 increments the value n of the external code by one (step S6), and acquires an internal code corresponding to the incremented external code from the host device and writes it into the EEPROM 17. The CPU 19 repeats the sequence of the process steps S4 to S6 till the value n of the external code reaches the final value, for instance, 255 (step S3). When n>255, the CPU 19 judges that all of the external codes have been defined (step S3), and ends the definition process.

The process to register the compression type of definition information into the EEPROM will be described with reference to FIG. 7. The CPU 19 acquires additional information 43 in the table of FIG. 5 from the host device, and writes it into the EEPROM 17 (step S11). The CPU 19 sets the value n of an external code to 0 (step S12), sequentially acquires external codes to be defined and the internal codes corresponding to the external codes from the host device (steps S14 and S15), and writes the internal codes as the information of the code conversion table into the EEPROM 17 (step S16). The CPU 19 increments the loop variable n by one (step S17), and repeats the code acquisition and writing. When the loop variable n reaches the number of defined characters N, the CPU 19 judges that all of the external codes have been registered (step S3), and ends the definition process.

Before the definition process is executed, it is desirable to send the following information from the printer to the host computer.

* Information as to if the printer has the defining function.
* Information on the kinds of the code conversion table already stored in the ROM 13.
* Character information of fonts and pitches.
* Information on the number of characters that can be defined number of tables, and the memory capacity of the EEPROM 17.

When the definition process starts in the host computer, the host computer sends a request signal to the printer. In response to the request signal, the printer returns these pieces of information to the host computer.

In executing the definition process, the following errors will possibly occur. When the errors occur, the following measure will be taken.

* An internal code specified by the host computer for defining the contents of the table is not found in those codes already contained in the printer. In this case, the printer sends error information to the host computer by way of the I/F 1 or to a user through the display of the switch panel 3 of the printer.
* The definition process ends even if an error partially occurs, such a symbol as "*" or space is printed in place of the print impossible character in the subsequent actual printing operation.

After the contents of the code conversion table are defined, it is necessary to inform a user of the presence of the table. One of the ways to inform him of it is given below. Generally, the printer has a code conversion table select mode in which code conversion tables available for use are presented to the user for his selection. In the code conversion table select mode, not only tables stored in the ROM 13 but also tables externally defined as well are presented for the user's selection. Also when receiving an inquiry from the host computer, the printer returns the tables stored in the ROM 13 and the tables externally defined as well, as usable tables, to the host computer.

Figure 8:
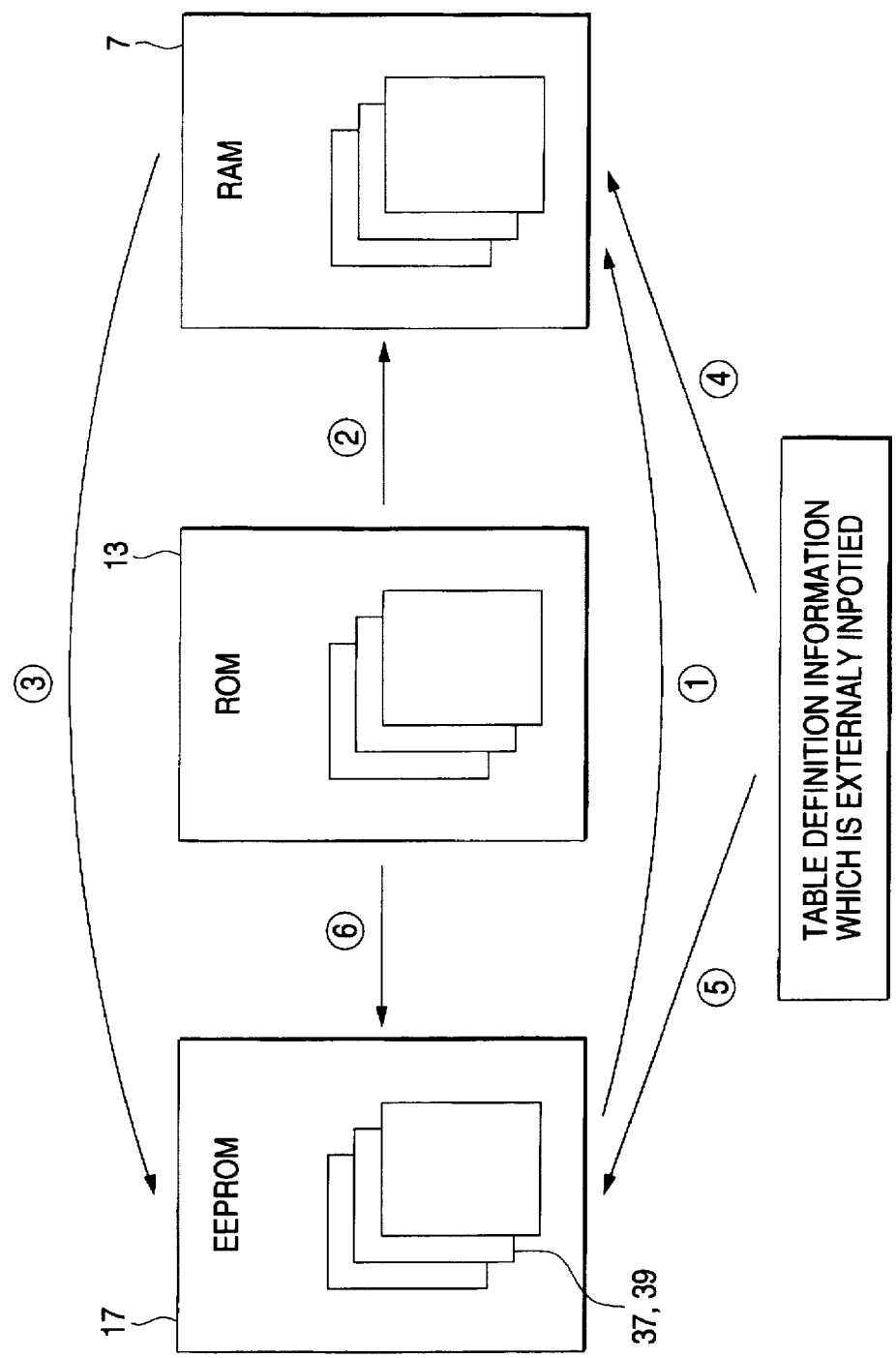
FIG. 8 is an explanatory diagram showing how to form a code conversion table on the basis of the information definition.

When the table definition information is stored in the EEPROM 17 and then the printer, or the CPU 19 of the printer, executes a print process in response to a related command from the host computer, the CPU 19 develops (or forms) the code conversion table, which is to be used for the printing process, on the RAM 7. FIG. 8 shows how to form or develop the code conversion table on the RAM 7.

In the case of the basic type definition information 37 (FIG. 4), the whole code conversion table is formed on the RAM 7 on the basis of the definition information 37 stored in the EEPROM 17 (arrow (1) in FIG. 8). The code conversion table on the RAM 7 is referred to in the print mode, by the CPU 19.

In the case of the compression type definition information 39 (FIG. 5), the code conversion table to be used as a base code conversion table is specified in accordance with the additional information in the definition information 39, and the base code conversion table is transferred from the ROM 13 to the RAM 7 and copied in the RAM 7 (arrow (2) in FIG. 8). Then, only the difference information of the base code conversion table in the RAM 7 are altered on the basis of the definition information 37 in the EEPROM 17 (arrow (1)), to thereby complete the code conversion table defined by the definition information 39.

A proper time before the printing operation, for example, the time of power on or the time of receiving a print command from the host device, may be used for executing the table forming process. The table forming process may be performed at such a proper time, each occasion. Where the EEPROM 17 is a satisfactorily large memory capacity, the formed table is copied from the RAM 7 to the EEPROM 17 when the code conversion table is formed in the RAM 7 (arrow (3) in FIG. 8), and subsequently all the CPU has to do is to copy the table from the EEPROM 17 to the RAM 7.

Figure 9:
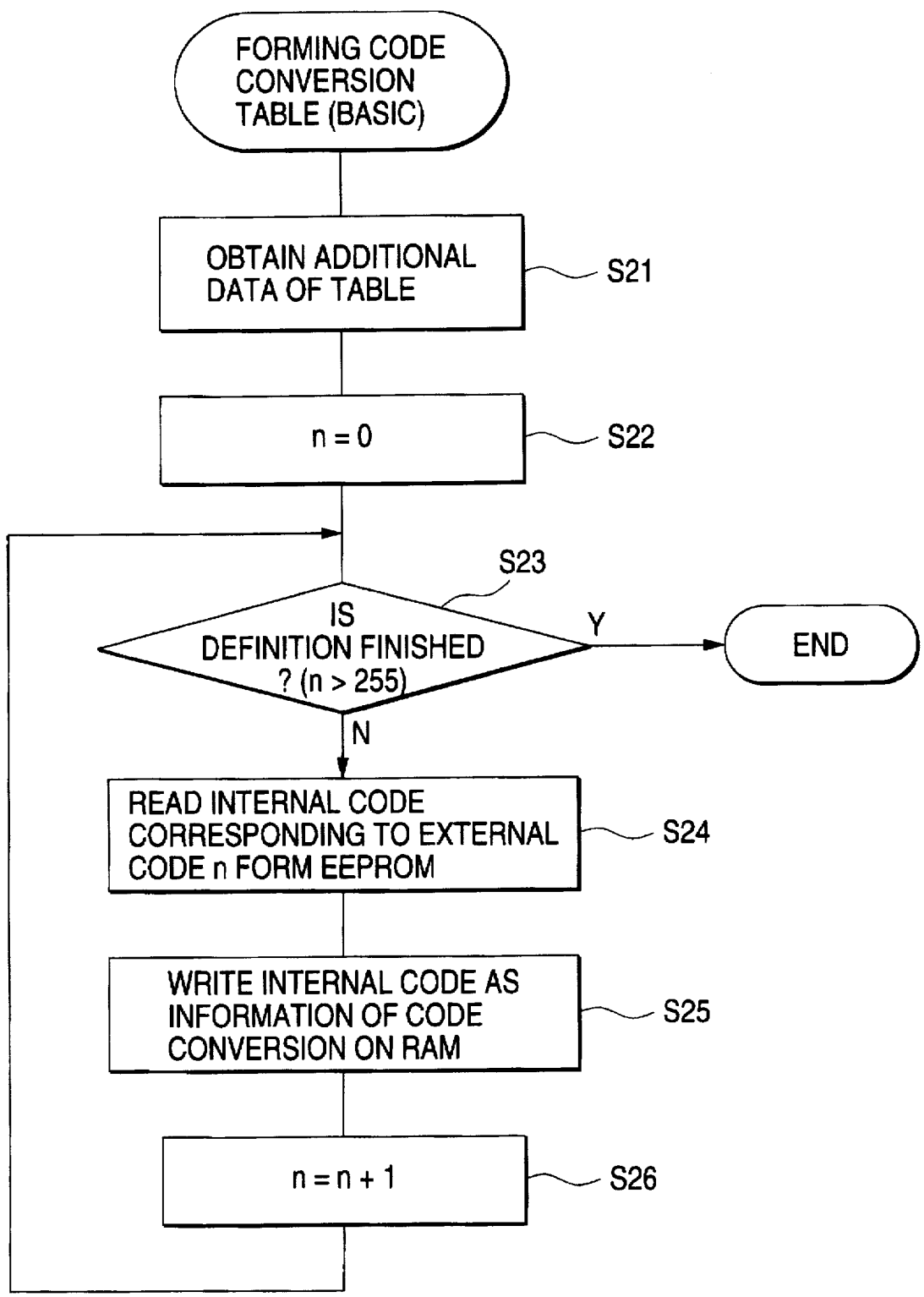
FIG. 9 is a flow chart showing a flow of the process to form a code conversion table on the basis of the basic type definition information.
Figure 10:
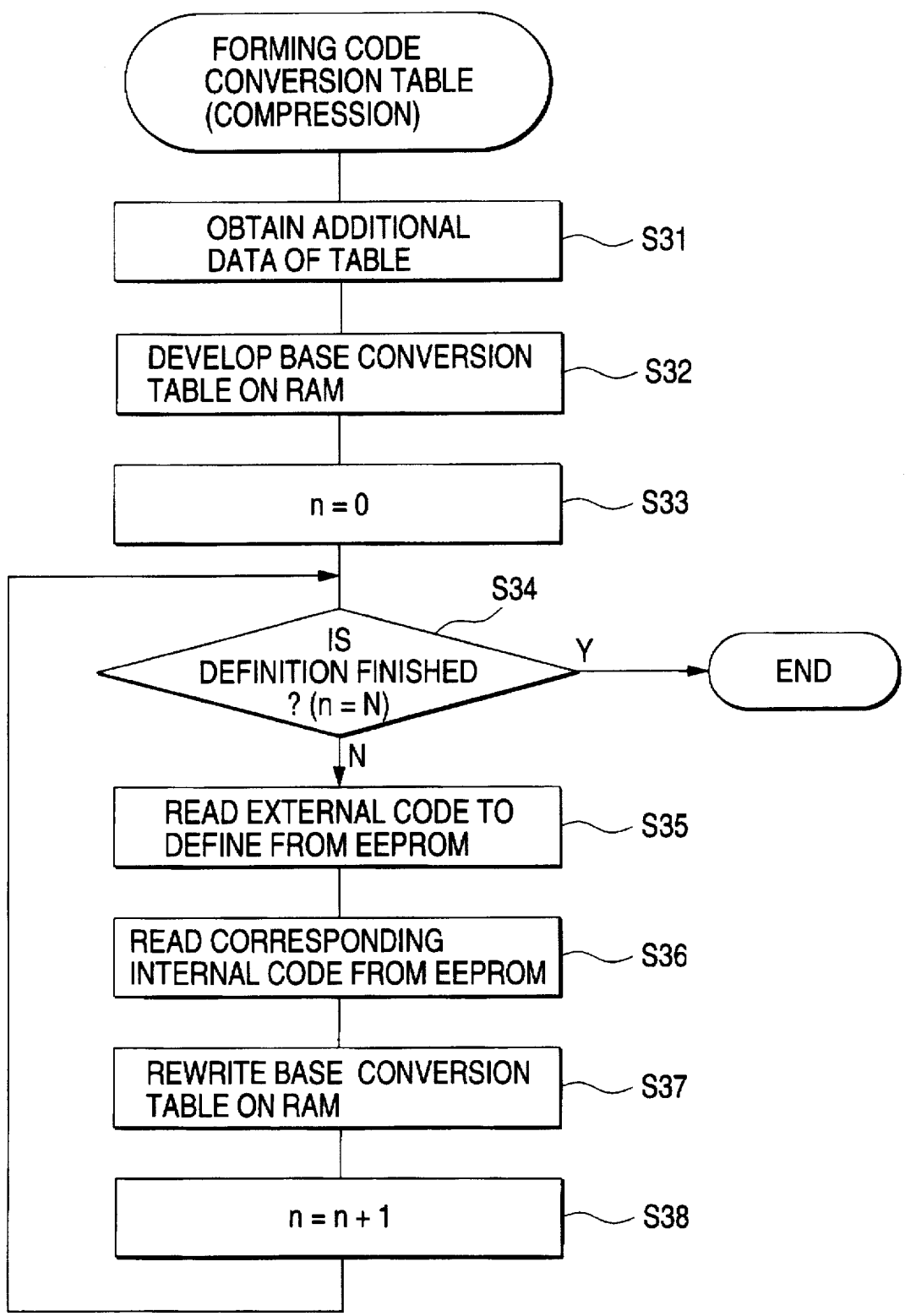
FIG. 10 is a flow chart showing a flow of the process to form a code conversion table on the basis of the compression type definition information.

FIGS. 9 and 10 are flow charts showing the flows of the processes for forming the code conversion tables in the RAM 7, executed by the CPU 19. FIG. 9 is a flow chart showing a flow of the process to form a code conversion table on the basis of the basic type definition information, and FIG. 10 is a flow chart showing a flow of the process to form a code conversion table on the basis of the compression type definition information.

In the case of the basic type, as shown in FIG. 9, the CPU 19 first acquires the additional information from the definition information 37 of the EEPROM 17 (step S21). Then, the CPU 19 sets the value n of the external code to 0 (step S22). The CPU reads the internal code corresponding to the value n of the external code from the definition information 37 stored in the EEPROM 17 (step S24), and writes the internal code as information of the code conversion table into a corresponding memory area in the RAM 7 (step S25). Then, the CPU increments the external code value n by one (n=n+1) (step S26), and repeats the code reading and writing steps.

In this way, the CPU repeats the sequence of the steps S24 to S26 till the external code value n=255 (step S23). When n>255, the CPU judges that the whole code conversion table has been developed on the memory (step S23), and ends the table forming process.

In the case of the compression type, as shown in FIG. 10, the CPU 19 first acquires the additional information from the definition information 39 of the EEPROM 17 (step S31). Then, the CPU 19 select a code conversion table to be used as a base code conversion table from among those tables stored in the EEPROM 17 on the basis of the additional information, and stores it into the RAM 7 (step S32). The CPU sets the value n of the external code to 0 (step S33). The CPU reads the internal code corresponding to the value n of the defined external code from the definition information 39 stored in the EEPROM 17 (steps S35 and 36), and rewrites the corresponding portion of the base code conversion table of the RAM 7 by using the readout code (step S37). The CPU increments the code value n by one (n=n+1) (step S38), and repeats the code reading and writing steps.

In this way, the CPU repeats the sequence of the steps S35 to S38 till the repeating variable n=the number (N) of definition characters (step S34). When n=N, the CPU judges that the whole code conversion table has been developed on the memory (step S34), and ends the table forming process.

Other table forming processes than the above-mentioned ones may be used. In a first table forming process of those additional ones, as shown in FIG. 8, when the table definition information is received from the host device (arrow (4) in FIG. 8), a code conversion table is formed on the RAM 7 on the basis of the received information, and is copied and stored in the EEPROM 17 (arrow (3)), and subsequently the table is copied from the EEPROM 17 in the RAM 7 (arrow (1)), and is referred to in the print mode. In a second table forming process, a code conversion table is directly formed on the EEPROM 17 on the basis of the definition information received from the host device ((5) in FIG. 8). Subsequently, the table is copied from the EEPROM 17 to the RAM 7 as in the first table forming process, and it is referred to in the print mode. In those two table forming processes, when the input definition information is of the compression type, the table to be used as a base code conversion table is copied from the ROM 13 to the RAM 7 or EEPROM 17 (arrow (2) or (6) in FIG. 8). Thereafter, only the difference information of the base code conversion table are altered on the basis of the definition information.

The code conversion tables for the major language spheres, stored in the ROM 13, are also stored in a similar way. Specifically, one of those code conversion tables is stored in the completed form, while the remaining code conversion tables are stored in the form of the difference information of them from the information of the base code conversion table. If one of those code conversion tables must be used, it is developed on the RAM 7 as in the above-mentioned manner, and may also be stored in the EEPROM 17.

Figure 11:
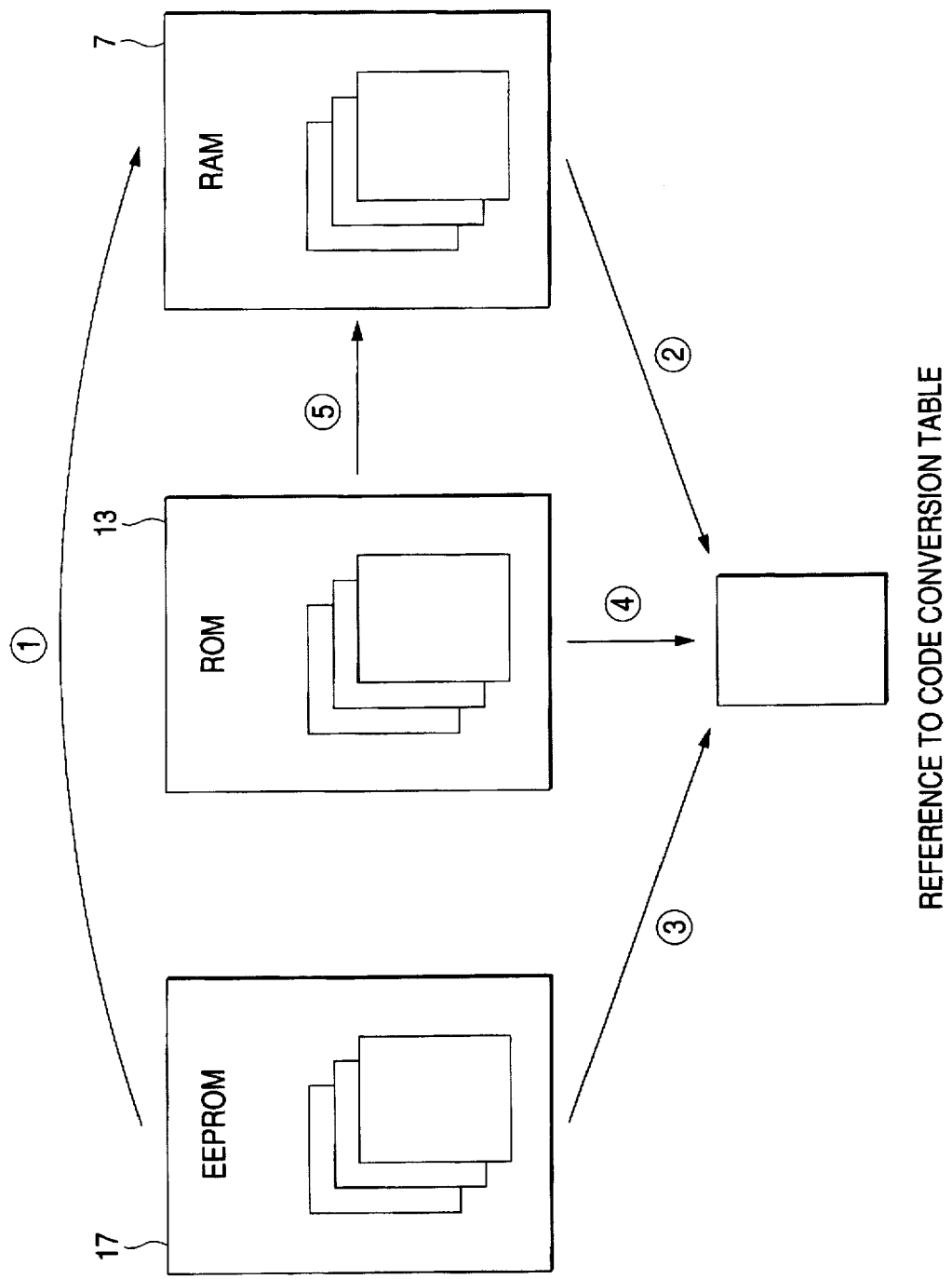
FIG. 11 is a diagram showing how a CPU refers to the code conversion table formed.

In a print mode, the specified code conversion table is selected from among those tables thus formed and referred to by the CPU 19. The "refer to the code conversion table" means "acquire an internal code corresponding to an external code on the basis of the first address of the specified code conversion table and the external code". FIG. 11 is a diagram showing how the CPU 19 refers to the code conversion table.

As already described, the code conversion table to be registered from exterior is formed on the RAM 7 or copied from the EEPROM 17 to the RAM 7 on the basis of the definition information in the EEPROM 17 before the print operation (arrow (1) in FIG. 11). The code conversion table formed on the RAM 7 will be referred to on the RAM by the CPU 19 (arrow (2)). A general EEPROM of which the access speed is low, used for the reprogrammable nonvolatile memory, may be substituted by a flash memory (flash EEPROM) or a backed-up RAM of which the access speed is high. If the high access speed memory is used, the code conversion table stored in the memory may be referred to on the memory (arrow (3)).

The code conversion tables for the major language spheres, which are stored in the RAM 7, may be referred to on the ROM 13 (arrow (4)). To secure high access speed, it is preferable to refer to the table on the RAM 7 after it is developed on the RAM 7 (arrow (5)).

The printer of the present embodiment has the function to externally register the character pattern information, in addition to the function to externally registering the code conversion table. The function to externally register the character pattern information will be described hereunder.

Figures 12, 13:
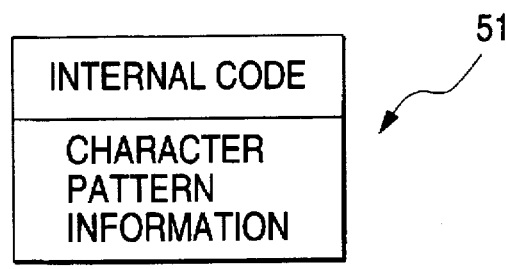
FIG. 12 is an explanatory diagram showing a structure of character pattern information externally registered.
FIG. 13 exemplarily shows a code conversion table using the externally registered characters.

The pattern information of all kinds of characters to possibly be used are contained in the CG 15. In some exceptional case, character pattern information of the characters not included in those in the CG 15 will be used by some exceptional language spheres or some users, however. In the printer of the present embodiment, a set 51 comprising an external code and additional character pattern information as shown in FIG. 12 may be registered to the EEPROM 17, from the host device. In the printer, the externally registered characters may be processed as the already contained characters. To this end, the numbers less than 9000 are assigned to the internal codes of the characters already contained in the CG, and the numbers equal to or greater than 9000 are assigned to the internal codes of those externally registered characters. The numbers thus assigned to the codes distinguishes the externally registered characters from the already contained characters. FIG. 13 exemplarily shows a code conversion table 53 using the externally registered characters. As seen from FIG. 13, the code conversion table 53 contains the internal code numbered 9200, which represents an externally registered character. The code conversion table 53 is also registered from the host device to the EEPROM 17 as in the already mentioned manner, as a matter of course.

Figure 14:
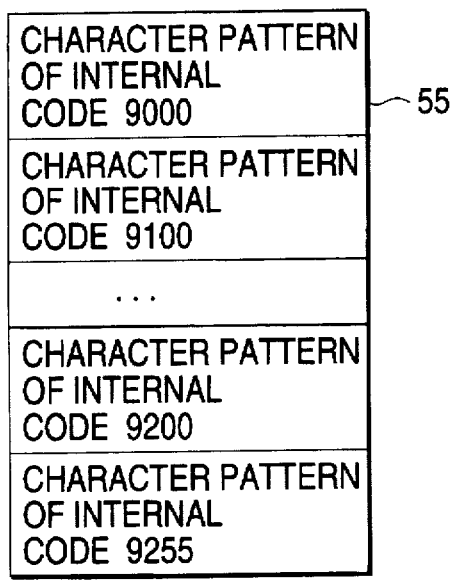
FIG. 14 is an explanatory diagram showing an externally registered character pattern information table developed on the RAM.

The pattern information 51 of the externally registered character shown in FIG. 12 is registered to the EEPROM 17 from the host device. Then, when the power switch of the printer is turned on, the pattern information 51 is copied from the EEPROM 17 to a specific memory area (e.g., an area for user definition character registration) of the RAM 7, so that a pattern information table 55 as shown in FIG. 14 is formed. In a print mode, the CPU 19 reads the pattern information of the characters to be printed from the pattern information table 55.

Figure 15:
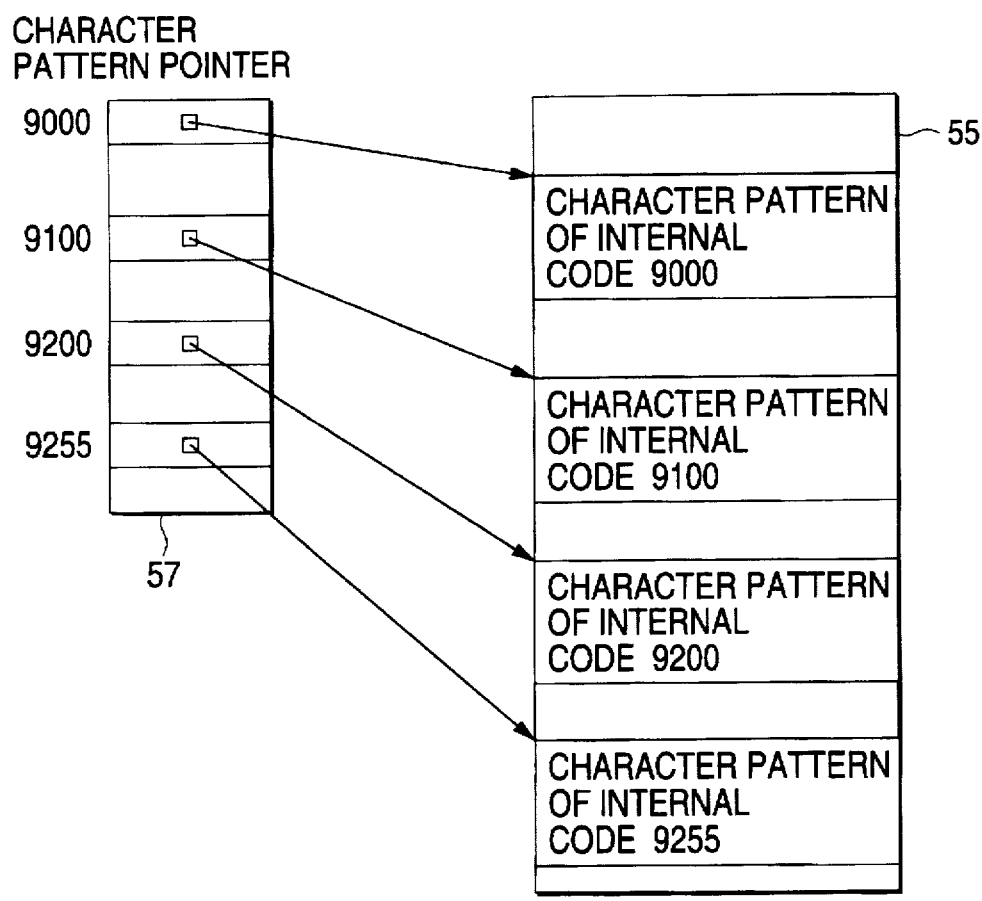
FIG. 15 is an explanatory diagram showing an externally registered character pattern information table developed on the RAM, and a pointer table.

In a system where the externally registered characters are equal in size, the character patterns are uniform in data size. Accordingly, the address of each character pattern in the pattern information table 55 shown in FIG. 14 can easily be calculated using the first address in the RAM 7 storing that table and the character code of each character. In a system where the character size is changed every character, each character address cannot be obtained by such a simple calculating method. An access to each character pattern information is difficult in case where only the pattern information table 55 shown in FIG. 14 are stored in the RAM 7. To cope with this, in this system, as shown in FIG. 15, a pointer table 57 containing a list of pointers of the character pattern information is formed when the pattern information table 55 of the externally registered characters is formed on the RAM 7. With provision of the pointer table 57, a high speed access to the character patterns in the pattern information table 55 is secured.

While there has been described what is at present considered to be the preferred embodiment of the present invention, it should be understood to those skilled persons in the art that the invention may be embodied in other various modes. Other functions may be added to the above-mentioned embodiment. For example, additional code conversion tables and character patterns may be stored by using a technique as mentioned above. Further, other contents may be written over or added to the code conversion tables already stored in the ROM 13 and the correspondence of the character patterns already contained in the CG 15 and the internal codes thereof. In this case, the data stored in the ROM 13 and the CG 15 cannot be rewritten or altered. However, the overwriting and adding of the other contents can be substantially realized by additionally using such a control that the access is made to the externally registered table and the character pattern before the corresponding data in the ROM 13 and the CG 15. This function is useful in correcting errors of the data in the ROM 13 and the CG 15 and in customizing the same.

What is claimed is:

1. A printer which receives external character codes from an external device, converts the external character codes to corresponding internal character codes while referring to a related code conversion table, selects character pattern information corresponding to the internal character codes from the character pattern information stored in a character generator contained therein, and prints the character pattern information, said printer comprising:

a ROM for storing at least one major code conversion table;

a reprogrammable nonvolatile memory;

a RAM;

table definition means for inputting, from exterior, table definition information defining an additional code conversion table, and registering the table definition information to said reprogrammable nonvolatile memory;

table forming means for forming the additional code conversion table on said RAM on the basis of said registered table definition information; and table referring means for referring to the additional code conversion table of the RAM in order to convert the external codes to the internal codes when said printer is in a print mode.

2. The printer according to claim 1, in which said table definition information is prepared such that a code conversion table is selected from among the code conversion tables stored in said ROM and used as a base code conversion table, and information of the additional code conversion table which is different from that of the base code conversion table is defined, and said table forming means forms the additional code conversion table on said RAM on the basis of said base code conversion table in said ROM and said difference information in said nonvolatile memory.

3. The printer according to claim 2, in which said ROM stores one base code conversion table and second difference information of an additional major code conversion table which is different from that of said base code conversion table, and said table forming means forms said additional major code conversion table on said RAM on the basis of said base code conversion table and said second difference information.

4. The printer according to claim 1, in which said reprogrammable nonvolatile memory is an EEPROM.

5. The printer according to claim 1, in which said reprogrammable nonvolatile memory is a backed up RAM.

6. The printer according to claim 5, in which said table forming means forms said additional code conversion table on said second RAM instead of said first RAM, and said table referring means refers to the code conversion table on said second RAM.

7. The printer according to claim 5, in which said table forming means copies said additional code conversion table already formed on said first RAM onto said second RAM, and said table referring means refers to said additional code conversion table on said second RAM.

8. The printer according to claim 1, further comprising:

character registering means for inputting, from exterior, additional internal codes and additional character pattern information associated with said additional internal codes and storing them into said nonvolatile memory;

character forming means for copying said character pattern information already registered in said nonvolatile memory onto said first RAM; and character selecting means for reading said additional character pattern information corresponding to said additional internal codes from said first RAM when said table referring means converts said external codes to said additional internal codes in a print mode.

* * * * *